(12) United States Patent
James

(10) Patent No.: US 8,905,447 B2
(45) Date of Patent: Dec. 9, 2014

(54) LANDSCAPING CARRIER

(71) Applicant: Michael James, Boerne, TX (US)

(72) Inventor: Michael James, Boerne, TX (US)

(*) Notice: Subject to any disclaimer, the term of this patent is extended or adjusted under 35 U.S.C. 154(b) by 0 days.

(21) Appl. No.: 14/218,921

(22) Filed: Mar. 18, 2014

(65) Prior Publication Data
US 2014/0265383 A1 Sep. 18, 2014

Related U.S. Application Data

(60) Provisional application No. 61/786,835, filed on Mar. 15, 2013.

(51) Int. Cl.
B65G 7/12 (2006.01)

(52) U.S. Cl.
CPC .................................. B65G 7/12 (2013.01)
USPC ............................................................ 294/15

(58) Field of Classification Search
USPC .......... 294/15, 140, 155; 5/625–627; 224/157
See application file for complete search history.

(56) References Cited

U.S. PATENT DOCUMENTS

| 224,617 | A | * | 2/1880 | Smith ............................. 294/15 |
| 375,785 | A | * | 1/1888 | Webb et al. .................... 294/15 |
| 809,003 | A | * | 1/1906 | Mitchell ........................ 294/16 |
| 1,292,268 | A | * | 1/1919 | De Camp ....................... 27/27 |
| 1,534,614 | A | * | 4/1925 | Sims .............................. 294/15 |
| 2,546,604 | A | * | 3/1951 | Lafky ............................. 296/20 |
| 2,715,030 | A | * | 8/1955 | Peterson ........................ 280/30 |
| 2,801,124 | A | * | 7/1957 | Colby ............................. 294/15 |
| 4,087,030 | A | * | 5/1978 | Knight ........................... 224/157 |
| 4,759,578 | A | * | 7/1988 | Gonzalez ....................... 294/15 |
| 5,368,353 | A | * | 11/1994 | Flanders et al. ............... 294/152 |

* cited by examiner

Primary Examiner — Dean Kramer
(74) Attorney, Agent, or Firm — Haynes & Boone LLP; William B. Nash; Jason Whitney

(57) ABSTRACT

An apparatus for carrying landscaping objects, the apparatus comprising a pair of lifting bodies, each lifting body having: a pair of substantially parallel elongated bars connected by a plurality of vertical supports, two lifting ends, two handles with one handle located near each of the two lifting ends, a joint, and a bracket; a pair of cross-assemblies, each cross-assembly having a first connecting end, a second connecting end, an inner bar, and an outer bar, wherein the first connecting end is attached substantially perpendicular to the joint of one lifting body and the second connecting end is attached substantially perpendicular to the bracket of the other lifting body; and a flexible net that is adapted for carrying attached to the pair of lifting bodies; wherein for each cross-assembly, the inner bar is adapted to slidably engage the outer bar to allow expanding and collapsing of the cross-assembly.

11 Claims, 11 Drawing Sheets

LANDSCAPING CARRIER

CROSS-REFERENCE TO RELATED APPLICATIONS

This application claims the benefit of U.S. Provisional Application No. 61/786,835, filed Mar. 15, 2013.

BRIEF SUMMARY OF THE INVENTION

An improved landscaping carrier for transporting pots, planters, balled-and-burlapped trees, boulders, and other landscaping objects too large or bulky for a single person to move.

DETAILED DESCRIPTION OF THE INVENTION

The invention may be generally described as a carrier or lifter for moving or transporting landscaping objects, typically objects too large or bulky for a single person to easily move. The objects to be lifted or moved may include pots, planters, balled-and-burlapped trees, and boulders.

Figure 1:
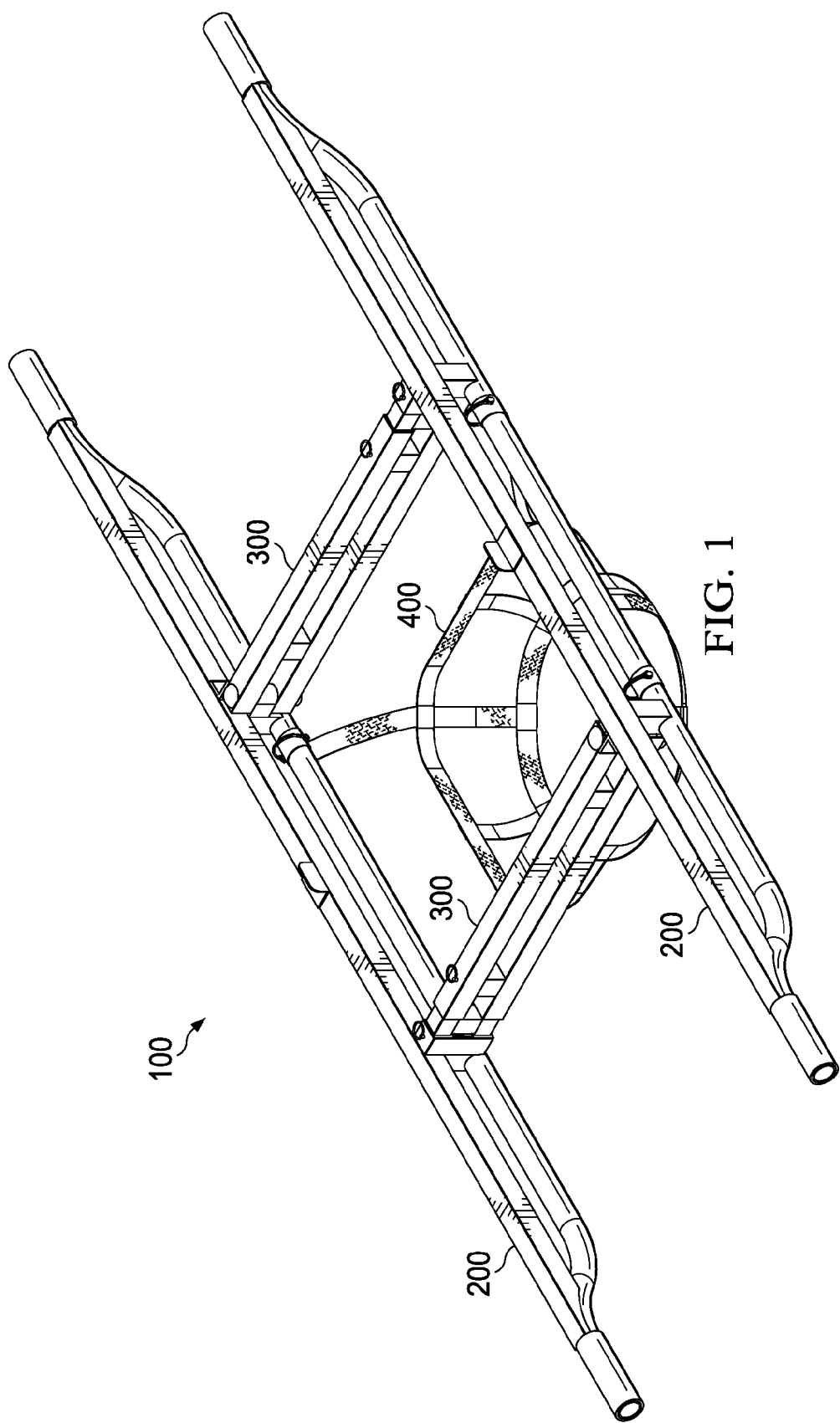
FIG. 1 is a perspective view of a carrier.

FIGS. 1-7 and 9-11 show one embodiment of a carrier 100 of the present invention. As illustrated in FIG. 1, carrier 100 may comprise a frame having pair of lifting bodies 200 connected via a pair of cross-assemblies 300. Netting 400 attaches to the lifting bodies 200 and hangs approximately in the center of carrier 100. Objects may be placed within the netting 400 for transportation.

Each lifting body 200 may be comprised of one or more elongated bars or beams. Each bar or beam may be tubular with a circular or square cross-section. Alternatively, each bar or beam may be solid with a circular, square, or I-shaped cross-section. If two or more bars or beams are present in the lifting body 200, the bars or beams may be arranged in a parallel manner. The lifting body 200 may have a linear shape. Alternatively, the lifting body 200 may have a bent or curved shape or include bent or curved components.

Figure 2:
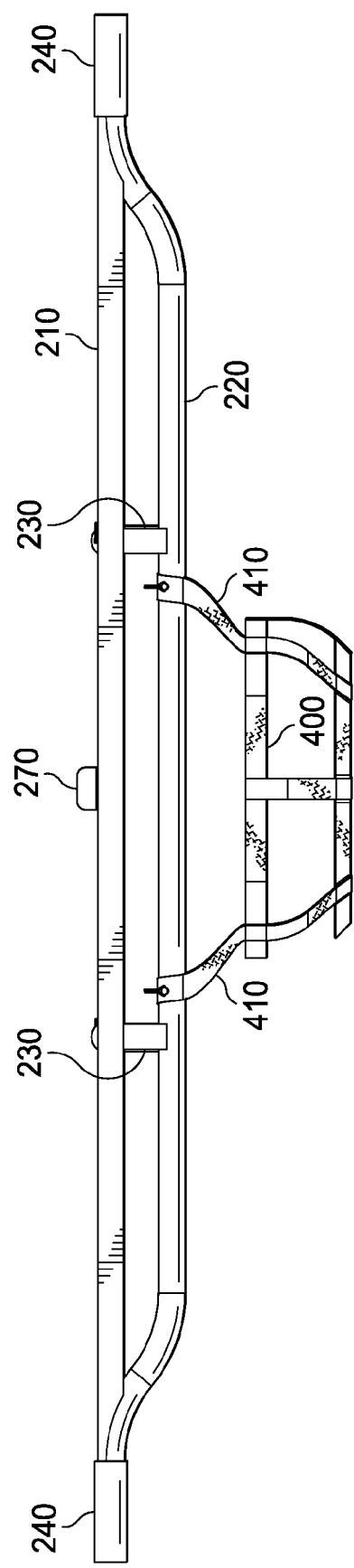
FIG. 2 is a side elevation view of a carrier.

Referring now to FIG. 2, each of the lifting bodies 200 includes a lifting body upper bar 210, a lifting body lower bar 220, a pair of handles 240, and a pair of lifting body vertical supports 230. The lifting body upper bar 210 is linear in shape, while the lifting body lower bar 220 includes two bent ends forming handles 240. The lifting body upper bar 210 attaches to the lifting body lower bar 220 near the handles 240.

The pair of lifting body vertical supports 230 attach to both the lifting body upper bar 210 and lifting body lower bar 220. The lifting body vertical supports 230 serve to stabilize and strengthen the lifting body 200, and may be located near the cross-assemblies 300. The lifting body vertical supports 230 may be mounted between the lifting body upper bar 210 and lifting body lower bar 220 (as in FIGS. 1 and 2), or to the side or sides of the lifting body upper bar 210 and lifting body lower bar 220. In one configuration, the lifting body vertical supports 230 may be tubular with a circular or square cross-section. In another configuration, the lifting body vertical supports 230 may possess a flat shape, such as a square or rectangular plate. Although FIG. 2 shows only two lifting body vertical supports 230, additional lifting body vertical supports 230 may be included to improve strength and stability of carrier 100.

As illustrated in FIG. 2, the handles 240 of each lifting body 200 are located at the ends of the lifting body 200. In an alternative configuration, one or more handles 240 may be positioned at various locations along the length of a lifting body 200. Each handle 240 may include rubber, plastic, or other material to facilitate gripping. For example, the handles 240 may include yellow gripping tape wrapped around the handles 240.

The upper bar 210, lower bar 220, pair of handles 240, and lifting body vertical supports 230 are typically connected or attached together though welding or bolting, but they may also be connected or attached though other manner of securely joining or fastening.

The lifting body 200 may include a lip, ridge, flange, or hook to support or stabilize objects carried in netting 400. For example, referring to FIGS. 2 and 4, each lifting body 200 includes an L-shaped lip 270 mounted to the upper surface of the upper bar 210. The lip 270 can be used to hold or support the straps of a ball-and-burlapped tree or the lip of a pot. Each lifting body 200 may include one or multiple hooks or lips 270.

For the cross-assemblies 300 of carrier 100, each cross-assembly 300 may be formed of one or more beams or bars. Like the lifting bodies 200, each bar or beam of a cross-assembly 300 may be tubular with a circular or square cross-section, or alternatively, solid with a circular, square, or I-shaped cross-section. If two or more bars or beams are present in the cross-assembly 300, the bars or beams may be arranged in a parallel manner. The cross-assembly 300 may have a linear shape, or it may have a bent or curved shape or include bent or curved components.

Figure 5:
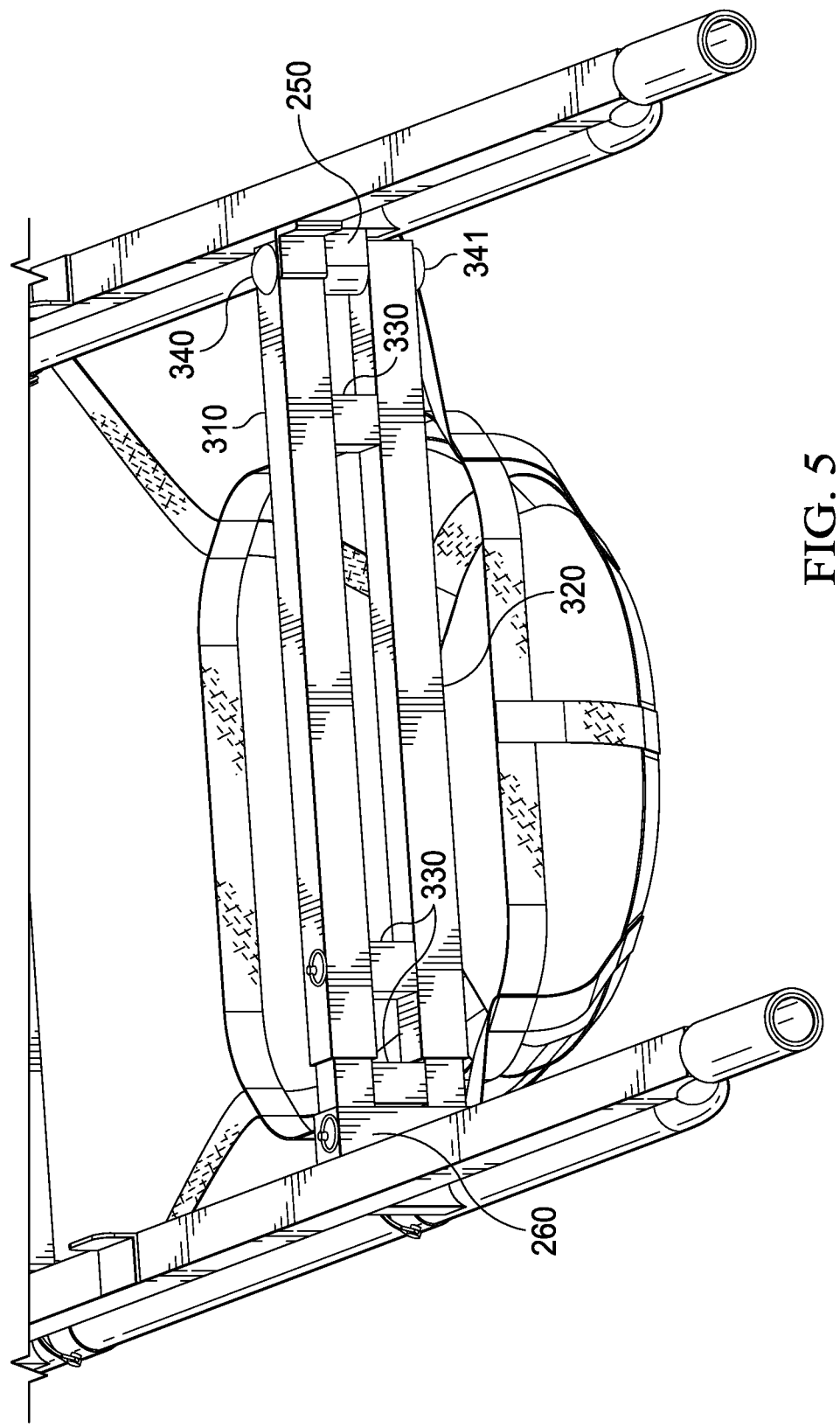
FIG. 5 is a perspective section view of a carrier's cross-assembly.

Referring to FIG. 5, each cross-assembly 300 includes a cross-assembly upper bar 310 parallel to a cross-assembly lower bar 320, connected by three cross-assembly vertical supports 330.

The three cross-assembly vertical supports 330 serve to stabilize and strengthen the cross-assembly 300. In one configuration, the cross-assembly vertical supports 330 may be tubular with a circular or square cross-section. In another configuration, the cross-assembly vertical supports 330 may possess a flat shape, such as a square or rectangular plate. Although FIG. 5 shows three cross-assembly vertical supports 330, additional cross-assembly vertical supports 330 may be included to improve strength and stability.

The cross-assemblies 300 may be connected or attached to the lifting bodies 200 though welding or bolting, or they may also be connected or attached though other manner of securely joining or fastening. Additionally, the cross-assemblies 300 may be secured to, but removable from, the lifting bodies 200.

Figure 6:
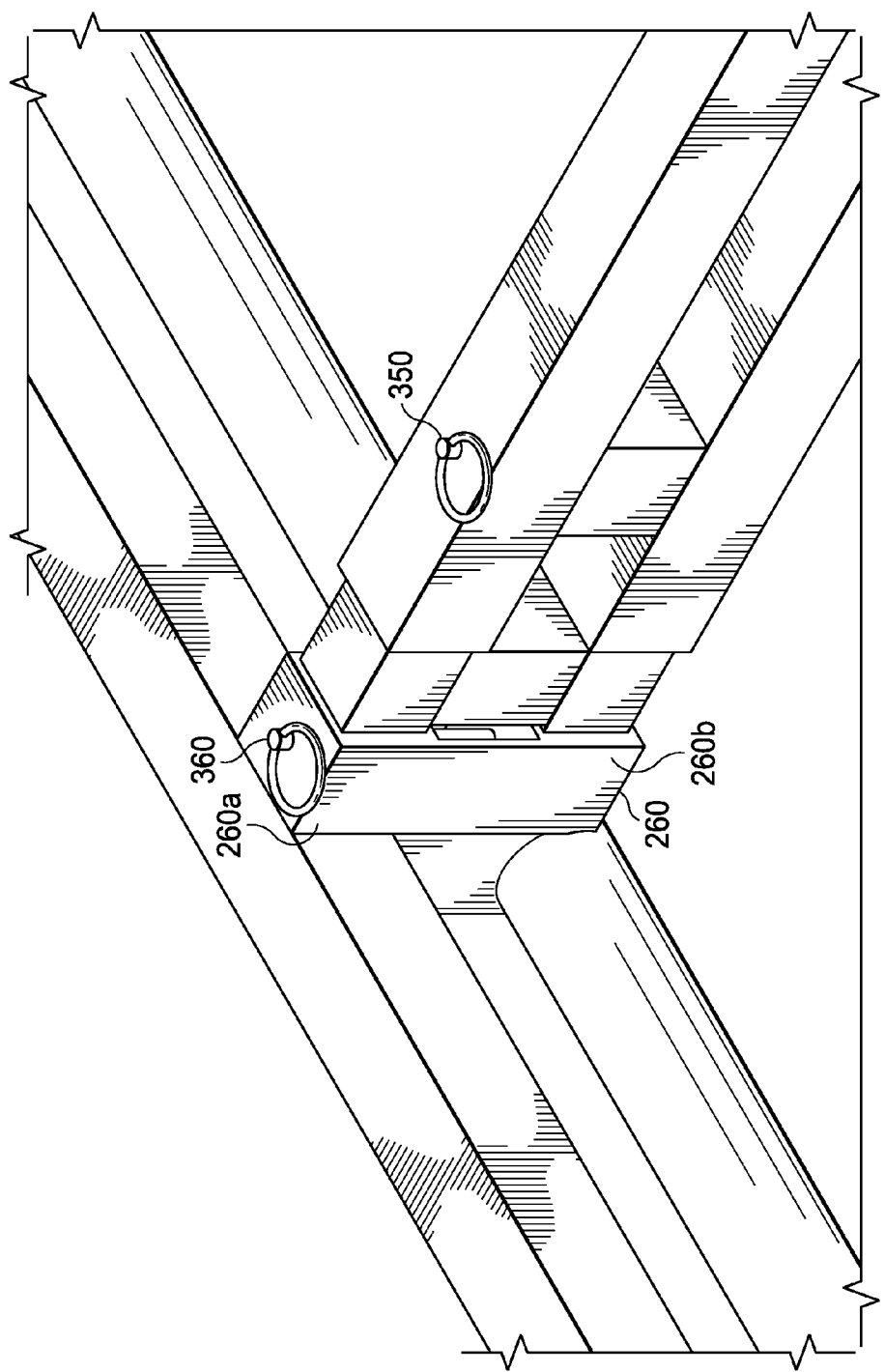
FIG. 6 is a perspective section view of a carrier's cross-assembly bracket.
Figure 7:
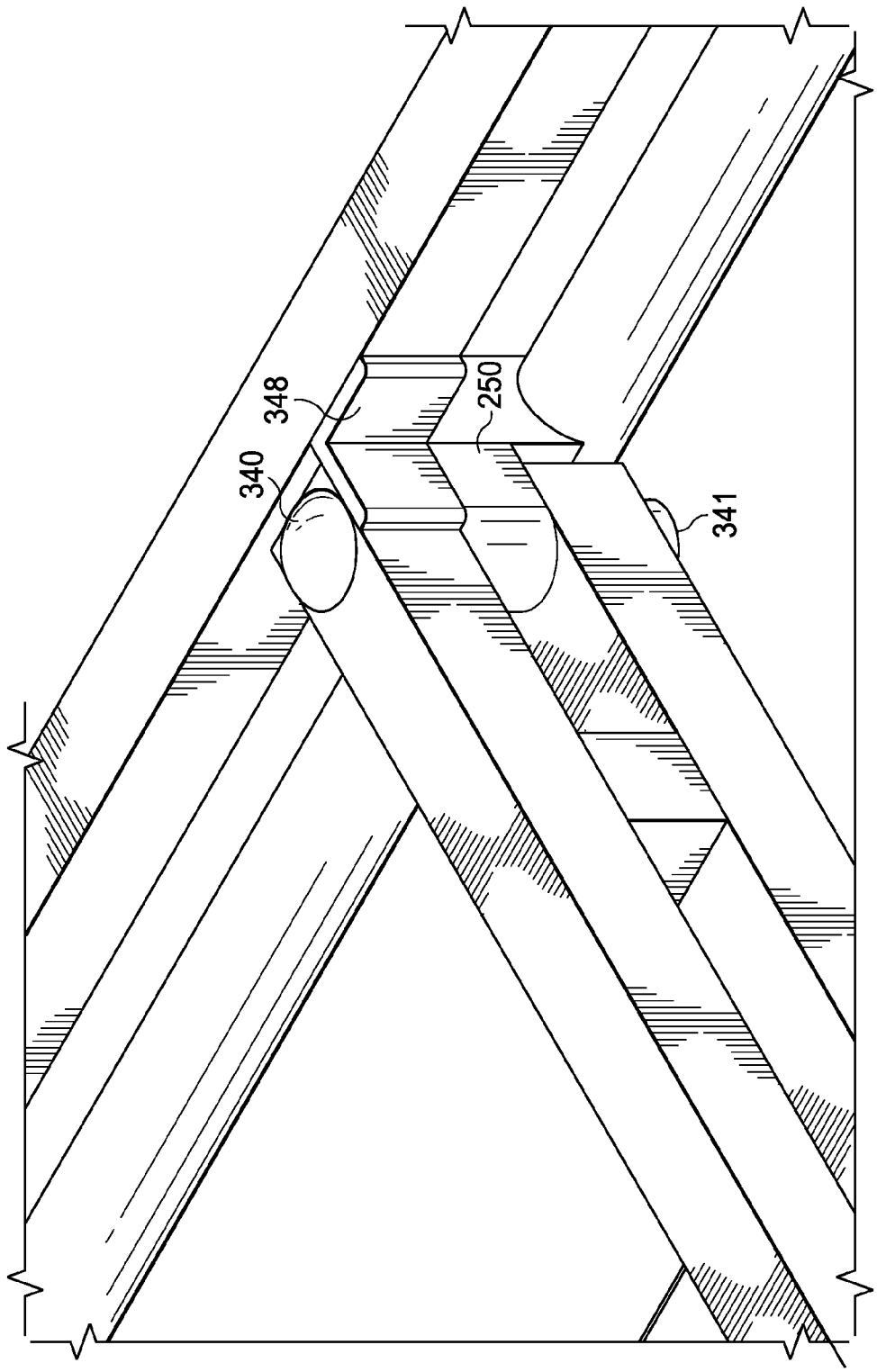
FIG. 7 is a perspective section view of a carrier's cross-assembly joint.
Figure 10:
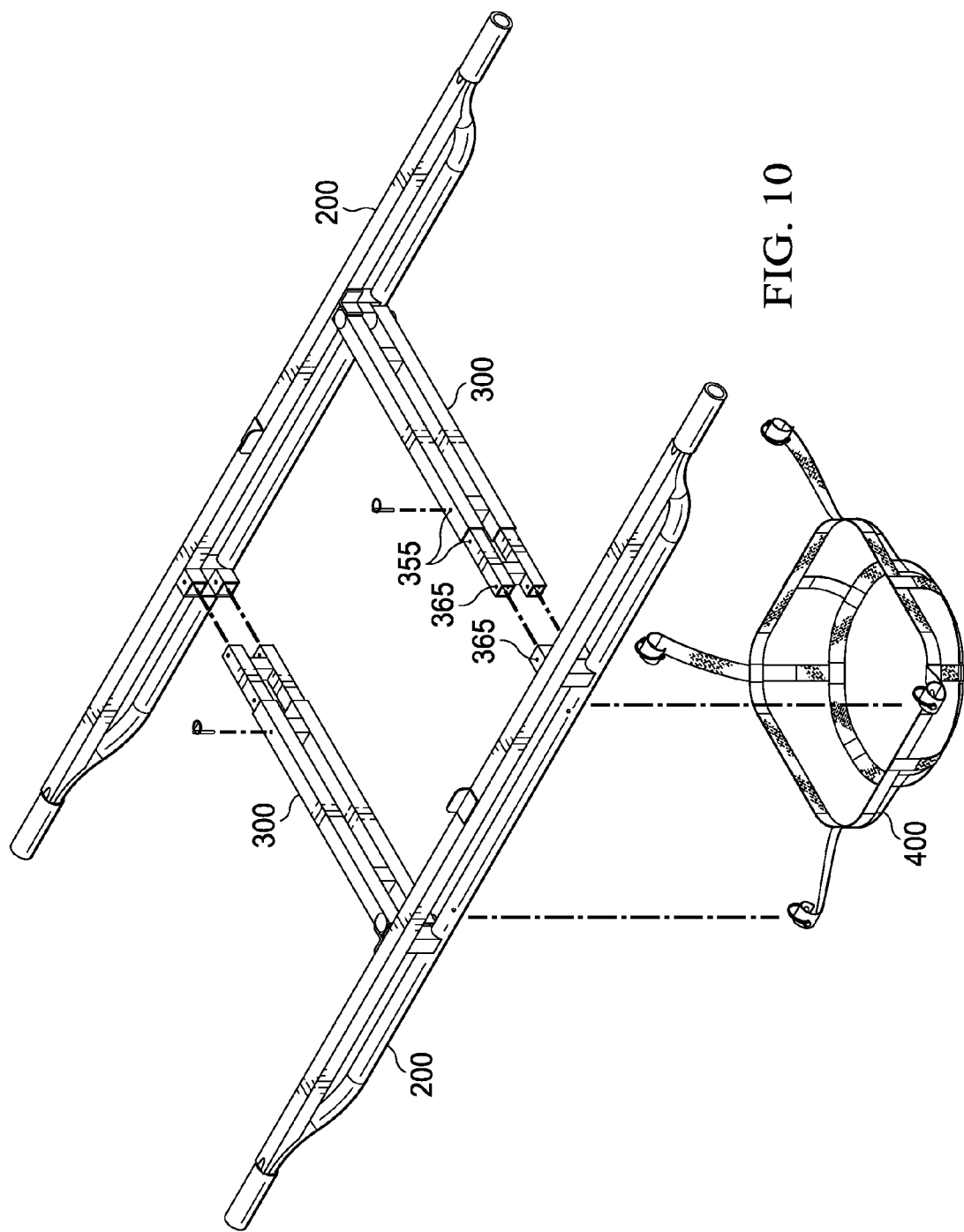
FIG. 10 is a perspective view of a carrier in an expanded configuration, with detached netting and detached cross-assembly brackets.

Referring to FIGS. 5, 6, and 7, the pair of lifting bodies 200 may include one or more brackets or joints adapted to engage the two cross-assemblies 300. FIGS. 5 and 7 show that each lifting body 200 may include one joint 250 adapted to engage a first end of cross-assembly 300. To secure the cross-assembly 300 to the lifting body 200 using joint 250, a bolt 340 is fitted through openings in both the cross-assembly 300 and joint 250. A nut 341 engages the threaded end of bolt 340. FIGS. 5 and 6 show that each lifting body 200 may also include one bracket 260 adapted to engage a second end of cross-assembly 300. The bracket 260 includes an upper receptacle 260a and lower receptacle 260b adapted to engage the cross-assembly upper bar 310 and cross-assembly lower bar 320, respectively. To secure the cross-assembly 300 to the lifting body 200 using bracket 260, a pin may be used. For example, a locking pin 360 may secure the cross-assembly 300 to the bracket 260. FIG. 10 shows locking pin openings or holes 365 in cross-assembly 300 and bracket 260 adapted to receive locking pin 360.

Figure 9:
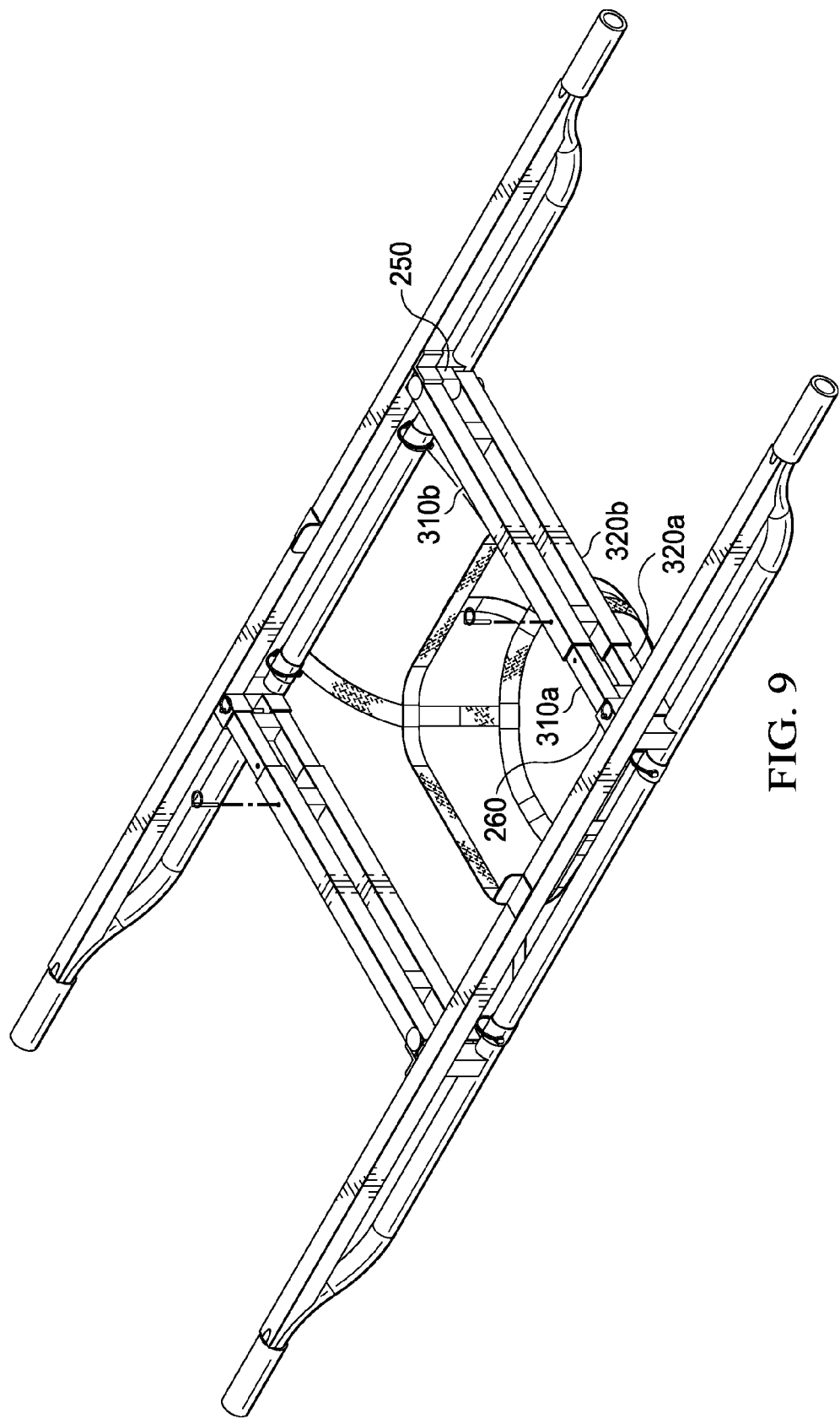
FIG. 9 is a perspective view of a carrier in an expanded configuration.

The two cross-assemblies 300 may also be adapted to collapse and expand to accommodate objects of varying sizes in the carrier 100. The cross-assemblies 300 may include two or more concentric components or elements of different sizes or diameters, adapted so that the elements are capable of sliding into one another, to allow expansion and collapse. Referring now to FIG. 9, each cross-assembly upper bar 310 includes an inner bar 310a and an outer bar 310b. The inner bar 310a of the cross-assembly upper bar 310 is adapted to slide within the outer bar 310b of the cross-assembly upper bar 310. Specifically, inner bar 310a has the same cross sectional shape as outer bar 310b, but a smaller size or diameter, allowing inner bar 310a to slide within outer bar 310b. Similarly, each cross-assembly lower bar 320 includes an inner bar 320a and an outer bar 320b. The inner bar 320a of the cross-assembly lower bar 320 is adapted to slide within the outer bar 320b of the cross-assembly lower bar 320. In this manner, carrier 100 may be expanded or collapsed along the two cross-assemblies 300 by pulling apart or pushing together the inner and outer bars.

Although FIG. 9 illustrates the use of elements with the same cross-sectional shape to permit expansion and collapse, this can be accomplished with elements having differing cross-sectional shapes. For example, a circular inner bar can slide within a square or triangular outer bar. Likewise, a square or triangular inner bar can slide within a circular outer bar.

If the two cross-assemblies 300 are collapsible and expandable, a pin may be used to secure each cross-assembly at a particular length. As shown in FIGS. 6 and 10, an expansion pin 350 may be used to secure the inner bar 310a to the outer bar 310b. More specifically, the expansion pin 350 passes through expansion pin openings or holes 355 in the inner bar 310a and in the outer bar 310b. Although not shown in the figures, the expansion pin 350 and expansion pin openings or holes 355 may also be located in the lower bar 320. Additionally, the inner bar 310a or outer bar 310b may include multiple openings or holes 355 to secure the cross-assembly 300 at varying lengths.

Referring now to FIG. 6, it is seen that the cross-assemblies 300 and lifting bodies 200 may be attached together at a fixed angle. For example, each cross-assembly 300 may attach to a bracket 260 of a lifting body 200 in an approximately perpendicular position, preventing rotation between the cross-assembly 300 and lifting body 200. Fixed angles other than 90° may also be used.

Figure 11:
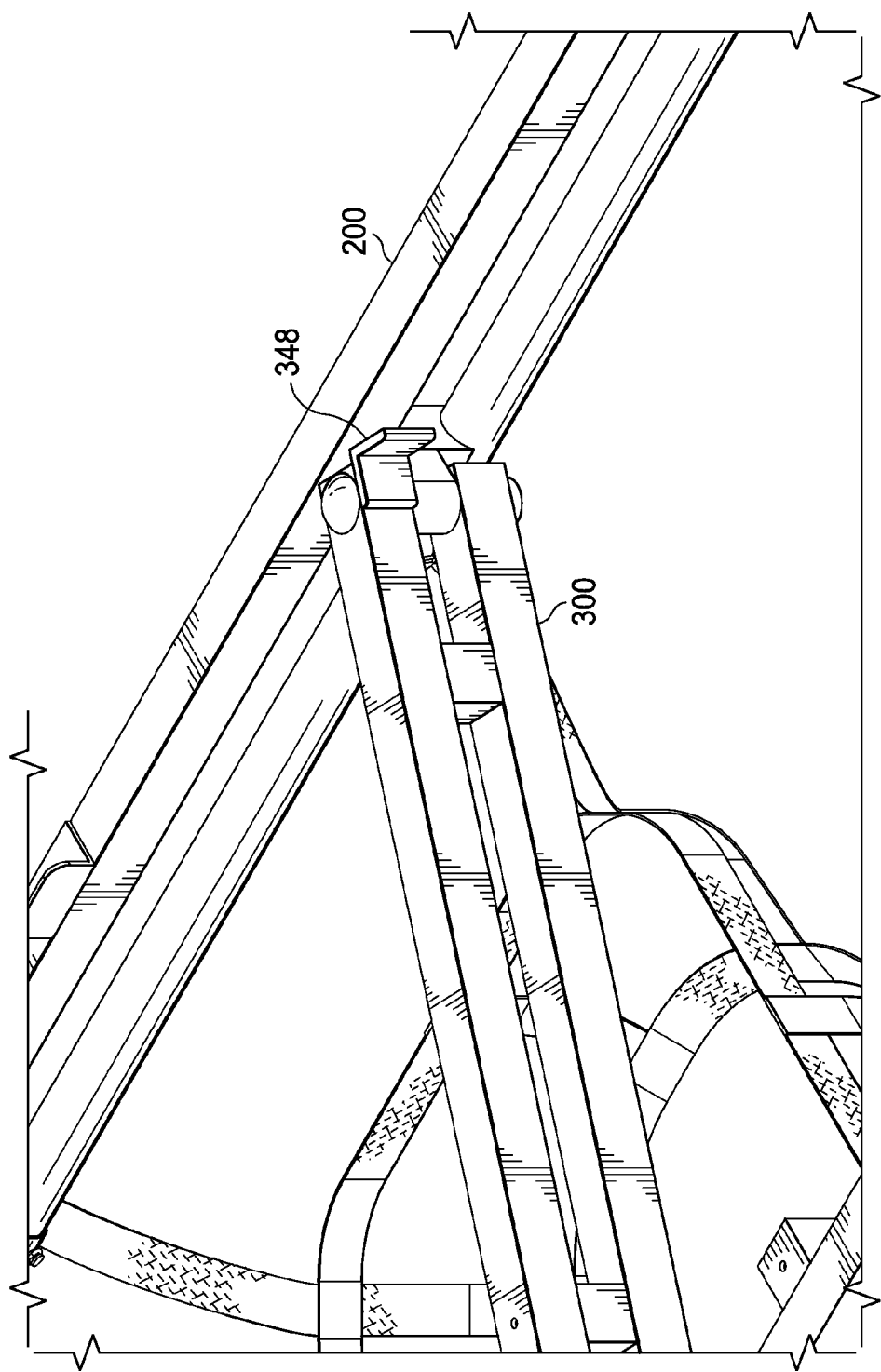
FIG. 11 is a perspective section view of a carrier's cross-assembly positioned at non-perpendicular angle.

Alternatively, the cross-assemblies 300 and lifting bodies 200 may be attached together to form a movable joint or hinge. Referring to FIGS. 7 and 11, each cross-assembly 300 may attach to a joint 250 of a lifting body 200, allowing the cross-assembly 300 to rotate perpendicular or parallel to the lifting body 200, and to all angles in between. The cross-assembly 300 may also include a cross-assembly stop. The cross-assembly stop may be used to limit or restrict movement of the cross-assembly 300. For example, in FIGS. 7 and 11, an L-shaped cross-assembly stop 348 is attached to the outside of cross-assembly 300, preventing movement beyond the perpendicular. In an alternative configuration not shown in the figures, cross-assembly stop 348 may be positioned on the inside of cross-assembly 300. The cross-assembly stop need not be L-shaped at a 90° angle, but may be V-shaped with an angle other than 90° (e.g., a 45° V-shape). Additionally, the cross-assembly stop may be formed as a flat plate attached to the outside of cross-assembly 300, with only a side of the cross-assembly stop contacting the lifting body 200.

Figure 3:
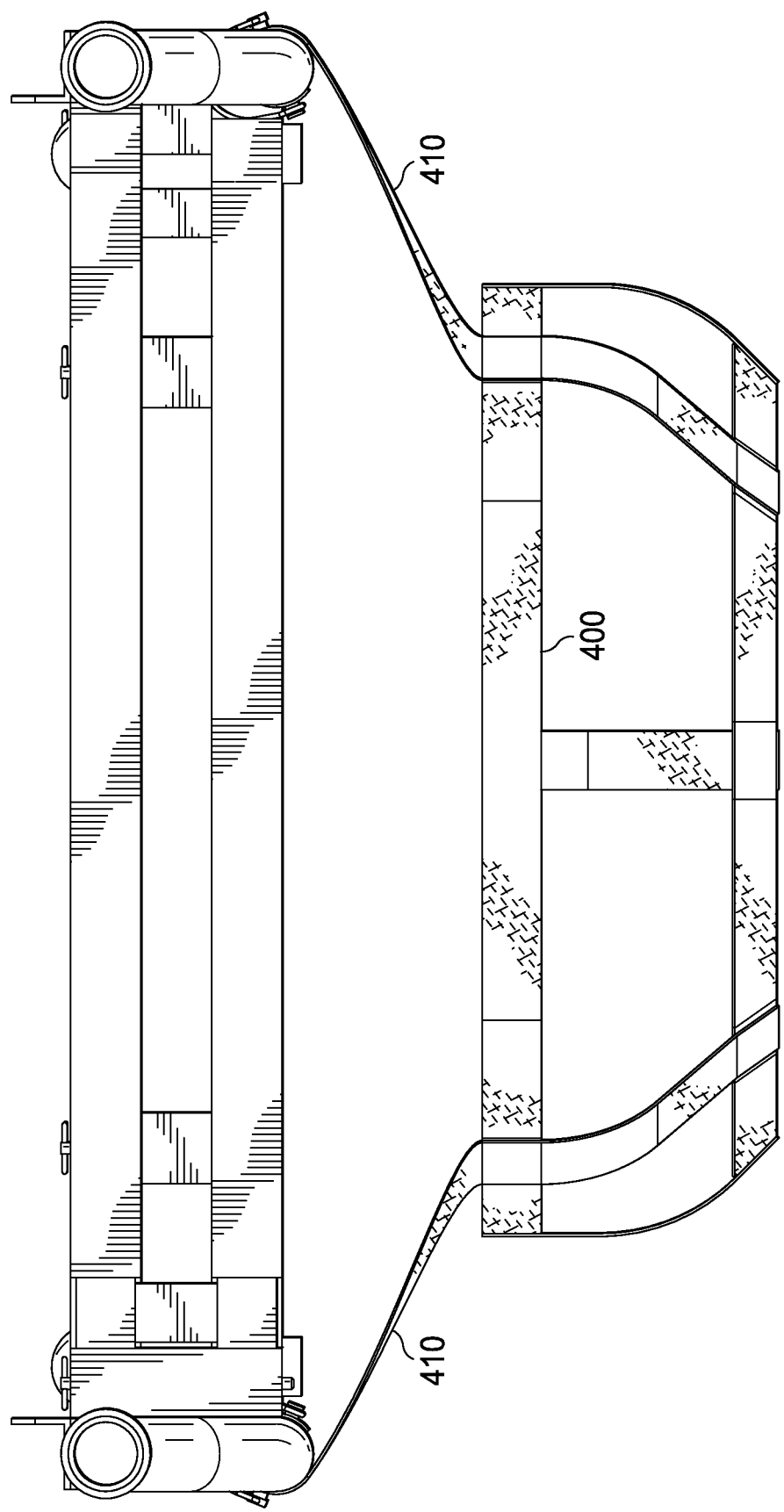
FIG. 3 is an end elevation view of a carrier.
Figure 4:
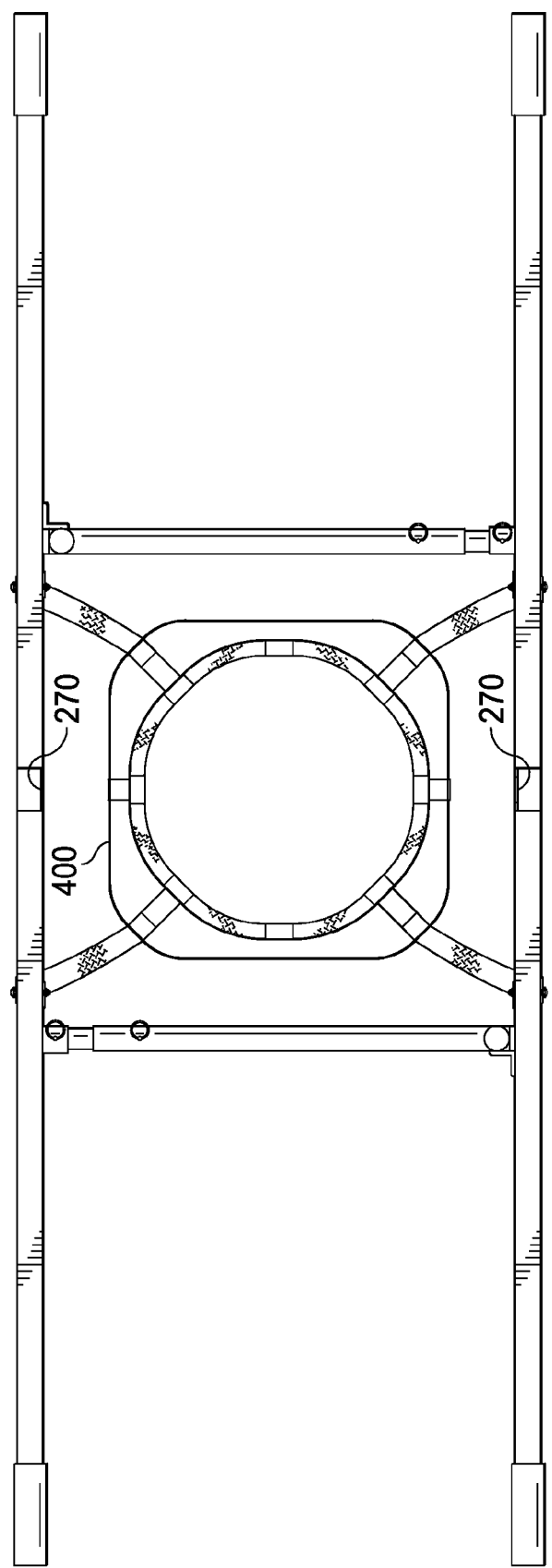
FIG. 4 is a top plan view of a carrier.
Figure 8:
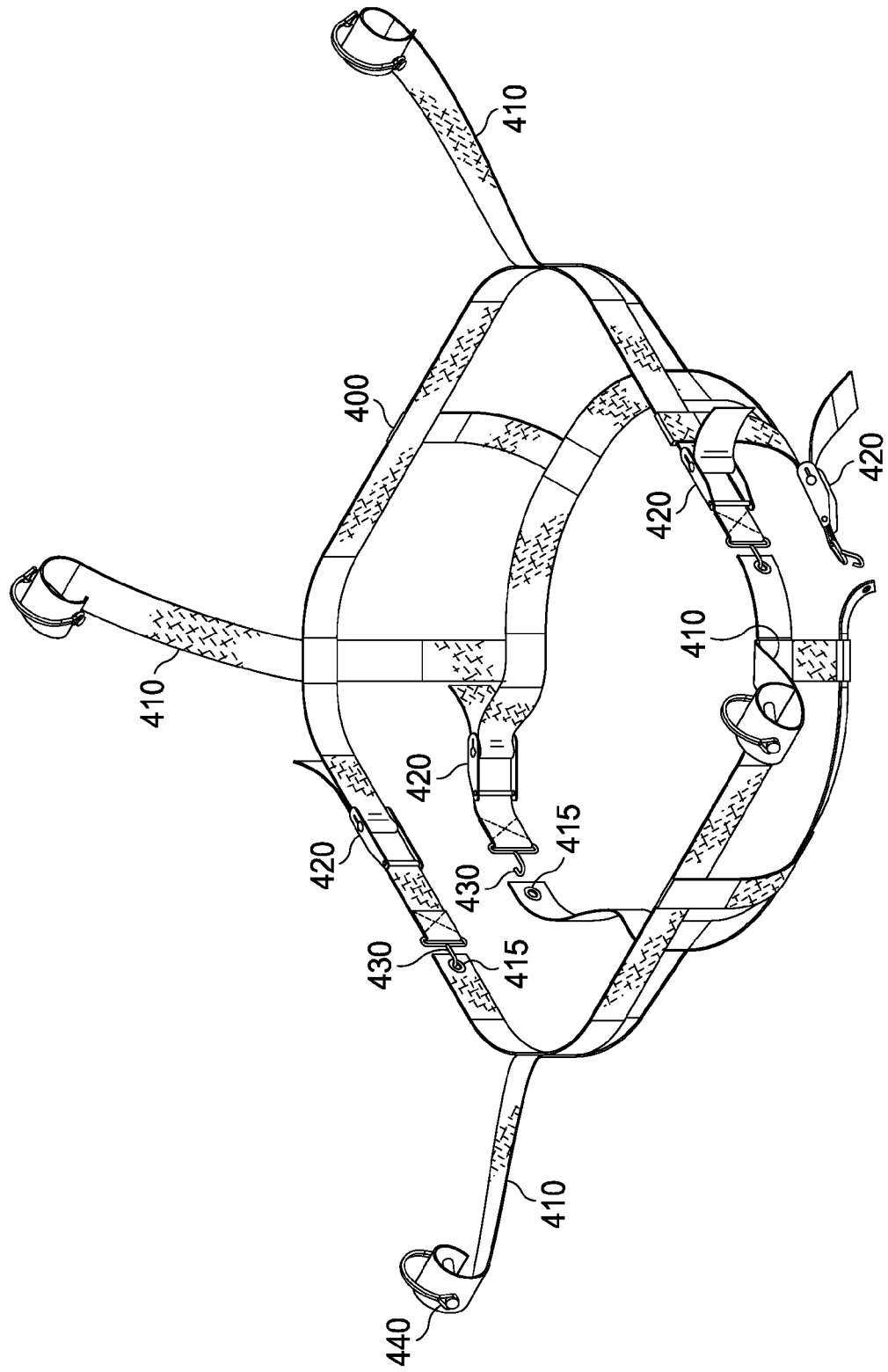
FIG. 8 is a perspective view of an alternate embodiment of a carrier's netting.

The netting 400 may be made of braided or woven nylon or polyester fabric, or other durable materials for carrying objects. Referring to FIGS. 2 and 3, the netting 400 attaches to each lifting body 200 with a pair of straps 410. Thus, for two lifting bodies 200, netting 400 will have a total of four straps 410. Each strap 410 partially wraps around a lifting body 200, and a netting pin 440 secures the strap 410 to the lifting body 200, as shown in FIG. 8. More specifically, each netting pin 440 passes through the lifting body lower bar 220 and through two eyelets sewn or placed in the strap 410, with one eyelet positioned on each side of the lifting body lower bar 220.

FIG. 8 shows an alternate embodiment of the netting 400 with additional hardware to allow adjustment of the netting 400. For example, netting 400 may include one or more adjustable buckles 420 to allow a user to change the size or shape of netting 400. The buckles 420 may be cam buckles, side release buckles, or metal slides. Similarly, the netting 440 may also incorporate hooks 430 adapted to engage grommets 415. The addition of the hooks 430 and grommets 415 permits users to open and close the netting 440 around objects.

Carrier 100 may be composed of steel, aluminum, or other lightweight, sturdy material, although the netting 400 will typically use the materials described above. The cross-sections of the various parts of carrier 100, including the bars, brackets, and supports, may be square, circular, rectangular, T-shaped, or I-shaped. The carrier 100 may be coated with a rust-proof or rust-resistant paint or coating to preserve carrier 100 from environmental wear and tear.

When used, the carrier 100 may be lifted by two people, each positioned at one end of the carrier 100 with each person using a pair of handles 240. Alternatively, the carrier may be lifted by four people, with each person positioned at one end of a lifting body 200 using a single handle 240.

The invention claimed is:

1. An apparatus for carrying landscaping objects, the apparatus comprising:
   a pair of lifting bodies, each lifting body having: a pair of substantially parallel elongated bars connected by a plurality of vertical supports, two lifting ends, two handles with one handle located near each of the two lifting ends, a joint, a bracket, and a lip mounted near the center of each of the pair of lifting bodies;

a pair of cross-assemblies, each cross-assembly having a first connecting end, a second connecting end, an inner bar, and an outer bar, wherein the first connecting end is attached substantially perpendicular to the joint of one lifting body and the second connecting end is attached substantially perpendicular to the bracket of the other lifting body; and a flexible net that is adapted for carrying attached to the pair of lifting bodies;

wherein for each cross-assembly, the inner bar is adapted to slidably engage the outer bar to allow expanding and collapsing of the cross-assembly;

wherein the pair of cross-assemblies are rotatably attached to the joints of the pair of lifting bodies; and wherein each cross-assembly further comprises a plurality of holes in the inner bar, a plurality of holes in the outer bar, and an expansion pin adapted to engage one of the outer bar holes and one of the inner bar holes.

2. The apparatus of claim 1, wherein each cross-assembly further comprises a stop preventing rotation beyond a perpendicular position.

3. The apparatus of claim 2, wherein the net further comprises a plurality of hooks, a plurality of grommets, and a plurality of buckles, for adjusting the size and shape of the net.

4. The apparatus of claim 3 further comprising a rubber grip on the two handles of each lifting body.

5. The apparatus of claim 1, wherein the two handles of each lifting body are located at the two lifting ends.

6. The apparatus of claim 5, wherein the first connecting end and second connecting end of each cross-assembly are attached perpendicular to the lifting bodies.

7. The apparatus of claim 1, wherein each lifting body has a curved shape.

8. The apparatus of claim 1, wherein the cross-assemblies are removable from the lifting bodies.

9. The apparatus of claim 1, wherein the two handles of each lifting body comprise a gripping surface selected from a group consisting of rubber plastic or tape.

10. The apparatus of claim 1, wherein the lifting bodies and cross-assemblies are made of steel.

11. The apparatus of claim 1, wherein the lifting bodies and cross-assemblies are made of aluminum.

\* \* \* \* \*